United States Patent
Buxton et al.

(10) Patent No.: US 10,156,872 B2
(45) Date of Patent: *Dec. 18, 2018

(54) SHIELDING VIA DISPLAY CHASSIS

(71) Applicant: Microsoft Technology Licensing, LLC, Redmond, WA (US)

(72) Inventors: Bert B. Buxton, Issaquah, WA (US); James M. Bonicatto, Seattle, WA (US); David J. Huston, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,168

(22) Filed: Nov. 18, 2016

(65) Prior Publication Data
US 2017/0068289 A1    Mar. 9, 2017

Related U.S. Application Data (63) Continuation of application No. 14/835,450, filed on Aug. 25, 2015, now Pat. No. 9,541,961.

(51) Int. Cl.
*G06F 1/16*    (2006.01)
*G06F 1/18*    (2006.01)
*H04B 15/04*   (2006.01)

(52) U.S. Cl.
CPC ............ *G06F 1/182* (2013.01); *G06F 1/1601* (2013.01); *G06F 1/163* (2013.01); *G06F 1/1658* (2013.01); *G06F 1/183* (2013.01); *H04B 15/04* (2013.01)

(58) Field of Classification Search
CPC ... G06F 1/133308; G06F 2001/133311; G06F 2001/133317; G06F 1/1637; H05K 1/0215
See application file for complete search history.

(56) References Cited

U.S. PATENT DOCUMENTS

| | | |
|---|---|---|
| 5,739,880 A | 4/1998 | Suzuki et al. |
| 6,310,767 B1 | 10/2001 | Spear et al. |

(Continued)

FOREIGN PATENT DOCUMENTS

| | | |
|---|---|---|
| EP | 1524549 A1 | 4/2005 |
| GB | 2517422 | 2/2015 |

(Continued)

OTHER PUBLICATIONS

"International Search Report & Written Opinion Issued in PCT Application No. PCT/US2016/043800", dated Oct. 21, 2016, 11 Pages.

(Continued)

*Primary Examiner* — Adrian S Wilson
(74) *Attorney, Agent, or Firm* — Ray Quinney & Nebeker; Paul N. Taylor; Qudus Olaniran (57) ABSTRACT

An electronic device includes a case, an antenna supported by the case, a display module disposed within the case, a conductive chassis disposed within the case, the conductive chassis structurally supporting the display module, an electronics module disposed within the case such that the conductive chassis is positioned between the antenna and the electronics module, and an interconnect that electrically connects the conductive chassis and the case, the interconnect extending around the electronics module.

20 Claims, 3 Drawing Sheets

(56) References Cited

U.S. PATENT DOCUMENTS

| | | |
|---|---|---|
| 6,359,390 B1 | 3/2002 | Nagai |
| 6,509,877 B2 | 1/2003 | Masaki |
| 7,013,558 B2 | 3/2006 | Bachman |
| 7,184,117 B2 | 2/2007 | Suzuki |
| 7,259,958 B2 | 8/2007 | Bang et al. |
| 8,692,948 B2 | 4/2014 | Park et al. |
| 9,541,961 B1 * | 1/2017 | Buxton ................ G06F 1/1658 |
| 2002/0024624 A1 | 2/2002 | Takenaka |
| 2004/0004680 A1 | 1/2004 | Kim |
| 2004/0114062 A1 | 6/2004 | Nishio et al. |
| 2005/0062657 A1 | 3/2005 | Lin |
| 2006/0028790 A1 | 2/2006 | Baek |
| 2006/0061512 A1 | 3/2006 | Asano et al. |
| 2006/0082508 A1 | 4/2006 | Doczy et al. |
| 2006/0268193 A1 | 11/2006 | Wang et al. |
| 2007/0002535 A1 | 1/2007 | Kim |
| 2008/0049949 A1 | 2/2008 | Snider et al. |
| 2008/0079864 A1 | 4/2008 | Nishimura |
| 2008/0094786 A1 | 4/2008 | Liou et al. |
| 2009/0009944 A1 | 1/2009 | Yukawa et al. |
| 2010/0271762 A1 | 10/2010 | Chiang et al. |
| 2011/0051348 A1 | 3/2011 | Song |
| 2015/0146392 A1 | 5/2015 | Yamashita |

FOREIGN PATENT DOCUMENTS

| | | |
|---|---|---|
| WO | 03052678 A1 | 6/2003 |
| WO | 2014092049 A1 | 6/2014 |
| WO | 2014115226 A1 | 7/2014 |

OTHER PUBLICATIONS

Yuanhui Yu et al., "Research of Computer Electromagnetic Information Leakage Based on Three Layers of Protection Model", Journal of Chemical and Pharmaceutical Research, May 2014, pp. 210-217, vol. 6, Issue 5.

* cited by examiner

SHIELDING VIA DISPLAY CHASSIS

PRIORITY

This application is a continuation of U.S. patent application Ser. No. 14/835,450, filed Aug. 25, 2015, which is hereby incorporated by reference in its entirety.

DESCRIPTION OF THE DRAWING FIGURES

For a more complete understanding of the disclosure, reference is made to the following detailed description and accompanying drawing figures, in which like reference numerals may be used to identify like elements in the figures.

The disclosed devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

Electronic devices include an electronics module disposed within a case or shell. One or more antennas supported by the case are shielded from electromagnetic noise generated by the electronics module. The shielding is provided by a chassis disposed within the case to structurally support a display module of the electronic device. The chassis forms part of a shield lid that covers the electronics module. Leveraging the chassis for the additional purpose of shielding may render circuit- or board-level shielding unnecessary. The electronic device may be thinner and/or lighter without such components dedicated solely to noise shielding.

The shield lid includes an interconnect that electrically connects the chassis to the case, such as a conductive component thereof. The interconnect extends around or surrounds the electronics module. For instance, the interconnect is disposed along a perimeter of the chassis to surround the electronics module. In some cases and/or along one or more portions, the interconnect is discontinuous to allow air flow for cooling of the electronics module.

The interconnect may include a number of contacts. In some cases, the contacts are spaced apart from one another to allow the air flow. Alternatively or additionally, apertures in the contacts allow the air flow. The apertures may also reduce mass and part costs. The spacing, or the size of the apertures, may vary. For instance, the spacing or aperture size may vary based on a number of facts, including, for instance, the frequencies of the electromagnetic noise, the proximity to an antenna, and/or the proximity to the electronics module. Each contact may configured as or include a strip. The orientation of the strips may vary. For instance, the strips (or other contacts) may be oriented within a common plane and/or in separate planes as warranted for air flow and/or shielding.

The contacts may be configured and/or positioned to avoid generating visual artifacts. Visual artifacts may otherwise be generated by a touch event on a touch-sensitive display or other vertical force imposed upon the display module. The perimeter positioning of the interconnect may avoid the bowing of the interior of the display module. Alternatively or additionally, the contacts may be configured to convert a vertical force imposed on the electronic device into a lateral (e.g., outward) force.

The shielding may be useful in connection with a number of different types of antennas. The antenna(s) may be directed to wireless network connections (e.g., IEEE 802.11), short-range device connectivity (e.g., Bluetooth), and/or mobile broadband communications. The disclosed devices are thus not limited to any particular antenna, antenna type, and/or antenna arrangement.

The shielding is well suited for use with a wide variety of different electronic devices. For example, the size and form factor of the electronic device may vary considerably. Devices may range from wearable or handheld devices to televisions or other wall-mounted displays or other large-scale devices. Although some aspects relate to displays having a touchscreen or touch sensor unit, the electronic devices may not include a touch sensor or a touch-sensitive display. The composition and other characteristics of the display module and other components of the electronic device may also vary. For example, various types of displays may be used, including, for instance, organic light emitting device (OLED) displays and plasma displays.

Figure 1:
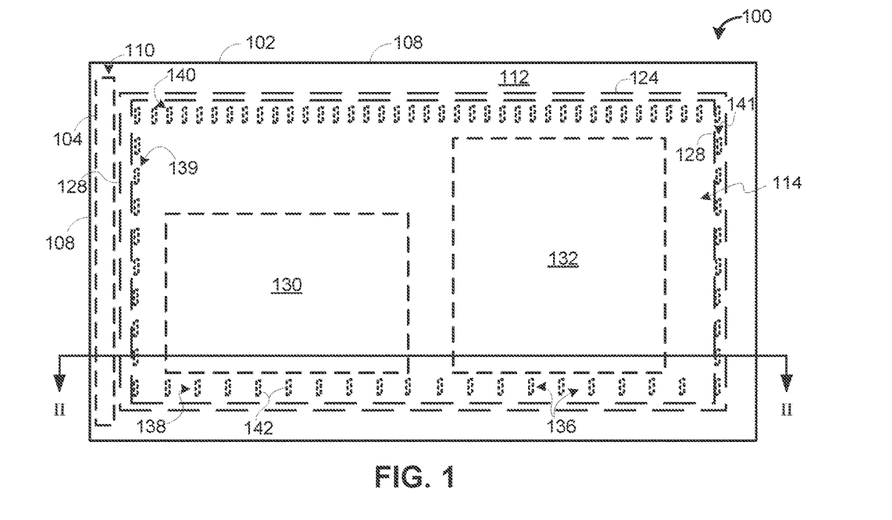
FIG. 1 is a plan view of an electronic device having a display chassis configured for shielding in accordance with one example.
Figure 2:
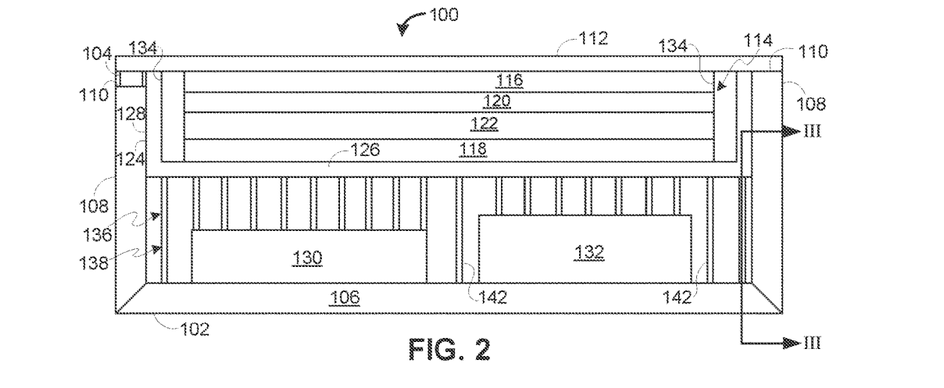
FIG. 2 is a cross-sectional view of the electronic device of FIG. 1 taken along lines II-II of FIG. 1 to depict the display chassis and an interconnect of the electronic device in greater detail.

FIGS. 1 and 2 show an electronic device 100 with electromagnetic shielding in accordance with one example. The electronic device 100 includes a case 102 (or shell) and an antenna 104 supported by the case 102. The case 102 may be configured as a bucket, tray, or other container in which the internal components of the electronic device 100 are disposed. The case 102 may thus act as a housing for the components. In this example, the case 102 defines a tablet-shaped housing.

The case 102 includes a bottom cover or backside 106 (FIG. 2) and sidewalls 108 extending upward or forward from the bottom cover 106 (FIG. 2). In this example, the antenna 104 is carried or mounted on a front or end surface 110 (FIG. 2) of one of the sidewalls 108. The width of the end surface 110 may be exaggerated in FIG. 1 for ease in illustration of the antenna 104. The sidewalls 108 may or may not be orthogonally oriented to the back cover 106. In some cases, the sidewalls 108 and/or the back cover 106 may be curved.

The electronic device 100 may include a transparent cover 112 disposed along a front side of the electronic device 100 opposite the bottom cover 106 of the case 102. The transparent cover 104 acts as an external display layer of the electronic device 100. In this example, the transparent cover 112 extends the entire lateral extent of the electronic device 100. The transparent cover 112 may thus extend across and over the sidewalls 108 of the case 102. The transparent cover 112 may thus rest upon, or cover, the end surfaces 110 of the sidewalls 108 and/or the antenna 104, as shown in FIG. 2. In other examples, the case 102 (or other component of the electronic device 100) has beveled edges that define an inner perimeter at which the transparent cover 110 terminates.

The transparent cover 112 extends over a display module 114 disposed within the case 102. The display module 114 may include, or be configured as, a number of units or panels arranged in a stack of films or layers. In this example, as shown in FIG. 2, the display module 114 include a touch sensor unit 116 to configure the display module 114 as a touch-sensitive display, or touchscreen. In some cases, the touch sensor unit 116 may be applied to an underside of the transparent cover 112. In this example, the display module 114 further includes a backlight unit 118, and a liquid crystal (LC) unit 120 between the backlight unit 118 and the touch sensor unit 116, and a number of light management films 122, such as a color filter layer, between the LC unit 120 and the backlight unit 118. The backlight unit 118 may include a light guide plate and various light management films or layers, such as a reflector film behind the light guide plate. These and other constituent components of the display module 114 are not shown in FIG. 1 in order to depict (in phantom) other internal components of the electronic device 100.

The electronic device 100 includes a chassis 124 disposed within the case 102. The chassis 124 may be adhesively bonded to the transparent cover 112 and/or the case 102. Alternatively or additionally, the chassis 124 may be engage, the case 102 via, e.g., an overhang or lip. The chassis 124 structurally supports the display module 114. For example, the constituent units of the display module 114 may be stacked on or otherwise carried by the chassis 124. In some cases, the backlight unit 118 rests upon a base plate 126 (FIG. 2) of the chassis 124. For example, the reflector film of the backlight unit 118 may be secured to, or otherwise in contact with, the base plate 126. The backlight unit 118 and other units of the display module 114 are laterally contained within a number of sidewalls 128 of the chassis 124 that extend upward, or forward, from the base plate 126. In the example of FIGS. 1 and 2, each sidewall 128 of the chassis 124 is disposed inward of, and extending along, a respective one of the sidewalls 108 of the case 102. The antenna 104 may then be mounted on, disposed in, or otherwise supported by the sidewall 108 of the case 102 outward of a respective one of the sidewalls 128 of the chassis 124. The antenna 104 may be supported by the case 102 in other ways. For instance, the antenna 104 may be disposed within the case 102, e.g., on a printed circuit board mounted or otherwise supported within the case 102.

Also disposed within the case 102 are an electronics module 130 and a battery 132. The electronics module 130 and the battery 132 may be disposed within a space, or cavity, defined by the case 102 and the chassis 124. The electronics module 130 may be spaced from one or both of the case 102 and the chassis 124 to allow air to flow through the cavity for cooling. Additional components of the electronic device 100 may also be disposed within the space occupied by the electronics module 130 and the battery 132.

The electronics module 130 may include a number of electronic components, including, for instance, a microprocessor, flash memory, transceivers, and power supply circuitry. The electronic components may be mounted on one or more circuit boards. The components of the electronics module 130 may vary considerably given the functionality of the electronic device 100.

The chassis 124 may have one or more holes to accommodate wiring between the electronics module 130 and the display module 114. The wiring may carry control signals and/or power for the components of the display module 114.

The components of the electronics module 130 generate electromagnetic noise. The frequency spectrum of the electromagnetic noise may overlap with the frequency band of the antenna 104. The antenna 104 is shielded from the electromagnetic noise by the chassis 124. As shown in FIGS. 1 and 2, the chassis 124 is disposed between the antenna 104 and the electronics module 130.

The chassis 124 may include one or more conductive components to provide the shielding. In some cases, the chassis 124 is constructed or composed of one or more metals (e.g., aluminum) or other conductive materials. For example, the chassis 124 may be composed of or constructed with sheet metal. In other cases, the chassis 124 may include a conductive film or layer in addition to one or more structural layers, which may be non-conductive. For instance, the chassis 124 may include a metal layer electroplated on a rigid, dielectric substrate. Alternatively, the conductive film may be a buried layer, e.g., an inner layer sandwiched between outer dielectric layers. The dielectric layers may be composed of a material that provides a desired amount of structural rigidity. In either case, the chassis 124 may be referred to herein as a conductive chassis as a result of the conductive component(s) thereof.

The sidewalls 128 of the chassis 124 may be positioned or configured to provide shielding. In the example of FIG. 2, the sidewalls 128 extend upward, or forward, to contact the transparent cover 112. The sidewalls 128 may thus be disposed alongside the antenna 104. The forward extent of the sidewalls 128 may vary. For instance, the sidewalls 128 may not reach or contact the transparent cover 112. A chassis with shorter sidewalls may nonetheless provide suitable shielding if, for instance, the antenna 104 is disposed within, or at an intermediate location along, one or more of the sidewalls 108 of the case 102 (rather than on the end surface 110 of the sidewall 108).

The display module 114 (and/or the electronic device 100) may include other internal structural support elements in addition to the chassis 124. In the example of FIG. 2, a frame 134 of the display module 114 provides structural support in addition to the chassis 124. The frame 134 may be disposed along, and configured to engage, a periphery of one or more of the films, layers, or other display components of the display module 114, such as the light management films 122. In some cases, a number of light sources of the backlight unit 118, such as edge-mounted light emitting diode (LED) devices, are carried or otherwise supported by the frame 134. The frame 134 is disposed within, and supported by, the chassis 124. For example, the frame 134 may be disposed in the lateral space between the units of the display module 114 and the sidewalls 128 of the chassis 124. The frame 134 may be a molded component. The frame 134 may accordingly be configured as a mold frame. The display module 114 may include additional, fewer, or alternative frames or framing.

Shielding is also provided by an interconnect 136 that electrically connects the chassis 124 and a conductive component of the case 102. As shown in FIG. 1, the interconnect 136 extends around the electronics module 130. Noise generated by the electronics module 130 may thus be blocked by the interconnect 136.

The interconnect 136 may surround the electronics module 130 to provide the shielding. In the example of FIG. 1, the interconnect 136 includes four walls 138-141 positioned along a perimeter of the chassis 124. The walls 138-141 of the interconnect 136 may be positioned in parallel with the sidewalls 128 of the chassis 124. The walls 138-141 of the interconnect 136 may surround the electronics module 130 in these and other configurations.

The interconnect 136 may also be positioned along the sidewalls 108 of the case 102. In the example of FIG. 1, a respective one of the walls 138-141 of the interconnect 136 is positioned in parallel with, or otherwise along, a respective one of the sidewalls 108 of the case 102. The interconnect 136 may thus surround other internal components of the electronic device 100, such as the battery 132. In other examples, one or more walls or other portions of the interconnect 136 may not extend along the sidewalls 108 of the case 102.

The walls 138-141 may or may not be aligned with the sidewalls 108 of the chassis 124. As shown in FIG. 1, the positioning of the walls 138-141 relative to the sidewalls 108 may vary. In that example, the walls 138, 140 are offset from the sidewalls 108, while the wall 141 laterally overlaps with one of the sidewalls 108. Other positions of the walls 138-141 may be used.

The interconnect 136 may be discontinuous to remove heat generated by the electronics module 130. One or more of the walls 138-141 of the interconnect 136 may be discontinuous. The discontinuous nature of the interconnect 136 allows air flow passing through the case to reach the electronics module 130. In the example of FIGS. 1 and 2, all four of the walls 138-141 of the interconnect 136 are discontinuous. In other examples, one or more of the walls 138-141 may be continuous, or solid.

The discontinuities in the interconnect 136 may be provided in various ways. In the example of FIGS. 1 and 2, the discontinuities are provided by using a number of spaced apart contacts 142 that collectively form the interconnect 136. The contacts 142 extend from the chassis 124 and/or the conductive component of the case 108, such as the bottom cover 106. In some cases, a pair of the contacts 142 are used to establish each electrical connection, one of the contacts 142 extending rearward (or downward) from the chassis 124 and the other one of the contacts 142 extends forward (or upward) from the bottom cover 106 of the case 102. The contacts 142 then overlap to form the connection. Examples are described in connection with FIGS. 4-8. Alternatively or additionally, a respective one of the electrical connections is established via a single, respective one of the contacts 142 that extends from both the chassis 124 and the bottom cover 106.

Each contact 142 may be shaped as, or otherwise, include a strip or tab. As shown in FIG. 1, the strip-shaped contacts 142 may be oriented in-plane or out-of-plane. For instance, the strips of the contacts 142 along the wall 139 of the interconnect 136 are oriented in parallel with the plane of the wall 139. Conversely, the strips of the contacts 142 along the wall 138 are oriented orthogonally to the plane of the wall 138. The difference in the orientation may allow the effective spacing of the interconnect 136 to be modulated without forcing the size and/or shape of the interconnect components to be modified. The orientation of the contacts 142 may be selected in accordance with the extent to which shielding is warranted at particular locations of the electronic device 100. For instance, locations near the antenna 104 may warrant an in-plane orientation. Proximity to heat sources and/or air holes in the case 102 may be alternative or additional considerations for the orientation of the contacts 142.

The density of the contacts 142 may also be selected to achieve a desired level of shielding. A change in the density of the contacts 142 may thus lead to a difference in the spacing along respective sections of the interconnect 136. In the example of FIG. 1, the spacing between adjacent out-of-plane contacts 142 differs between the walls 138 and 140. Adjacent contacts 142 along the wall 140 are closer to one another, which may be useful if, for instance, holes in the case 102 are disposed along the sidewall 108 closest to the wall 140.

The conductive component of the case 102 to which the interconnect 136 is connected may be disposed along a rear side of the case 102. In some cases, the conductive component of the case 102 is or includes the bottom cover 106. For example, the bottom cover 106 may be composed of, or include, magnesium and/or another metal or other conductive material. Other sections of the case 102 may then be composed of a different (e.g., non-conductive) material. For example, the sidewalls 108 of the case 102 may be composed of a dielectric material.

FIG. 2 is a cross-section taken along lines II-II of FIG. 1 to depict the display module 114, the chassis 124, and the wall 138 of the interconnect 136 in greater detail. In this example, the spacing between the contacts 142 is constant across the length of the wall 138. In other cases, the spacing may vary within a particular one of the walls. For instance, the spacing may be greater near the battery 132 than near the electronics module 130.

An air gap may be maintained between the chassis 124 and the electronics module 130. The gap may facilitate the removal of heat from the electronic device 100.

Figure 3:
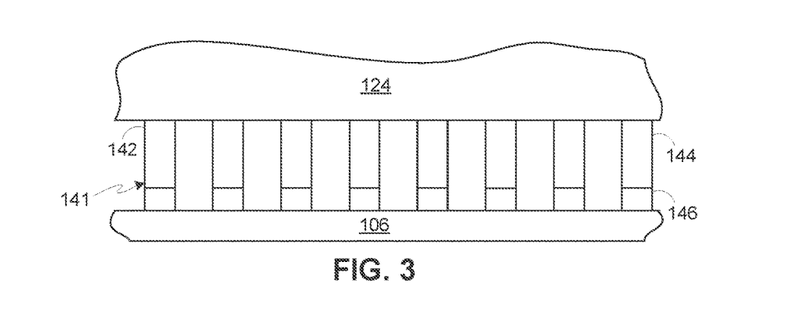
FIG. 3 is a cross-sectional view of the display chassis and the interconnect of the electronic device of FIG. 1 taken along lines III-III of FIG. 2 to depict the interconnect in greater detail.

FIG. 3 depicts the contacts 142 along one of the walls of the interconnect 136 in greater detail. In this example, the wall 141 of the interconnect 136 includes contact strips 144 that extend downward (or rearward) from the chassis 124, and contact strips 146 that extend upward (or forward) from the bottom cover 106 of the case 102 (FIG. 2). The contract strips 144, 146 overlap to establish the electrical connection.

In the example of FIG. 3, and as shown in FIG. 1, each contact strip 144, 146 is oriented in the plane in which the wall 141 is disposed. Alternatively, the contact strips may be oriented at an angle (e.g., orthogonally) to the plane of the wall. The orientation may vary between walls (or sections thereof) of a particular device.

The width and spacing of the contact strips 144, 146 may vary to provide a desired amount of shielding in one or more frequency bands. The width corresponds with the dimension of the plane in which the wall 141 is disposed. In the example of FIG. 3, the width of each contact strip 144, 146 equals the spacing between adjacent contacts strips 144, 146. The width and spacing may be, for instance, approximately 2 mm. Other widths and spacings may be used. In some cases, the width is not equal to the spacing. For example, in some cases, the width falls in a range from about 0.5 mm to about 1 mm, while the spacing falls in a range from about 1.5 mm to about 3 mm. Both the width and spacing may vary considerably in accordance with one or more factors, including the frequency band(s) of the antenna 104 (FIG. 1), the characteristics of the noise generated by the electronics module 130 (FIG. 1), the relative positioning of the noise source(s) and the antenna 104, the relative positioning of the heat sources (e.g., the electronics module 130 (FIG. 1) or a component thereof, and different levels of cooling.

The widths and spacing may vary between walls (or sections thereof) of a particular device. For instance, as shown in the example of FIG. 1, the spacing along the wall 138 is greater than the spacing along the wall 140. The wall 138 has larger spacing due to its proximity to the electronics module 130.

The length of the contacts 142 may vary in accordance with the vertical spacing between the chassis 124 and the bottom cover 106. The vertical spacing may vary considerably given the thickness of the device. In one example, the vertical spacing is about 3.5 mm. Each contact 142 may thus have a length that exceeds 1.75 mm (half of 3.5 mm) to establish the overlap and electrical connection. In other cases, a single contact is used to extend the entire vertical spacing between the chassis 124 and the bottom cover 106. In these and other cases, the bottom cover 106 may include sockets or other structures engaged by the contacts 142 to form contact points for the electrical connection.

Figure 4:
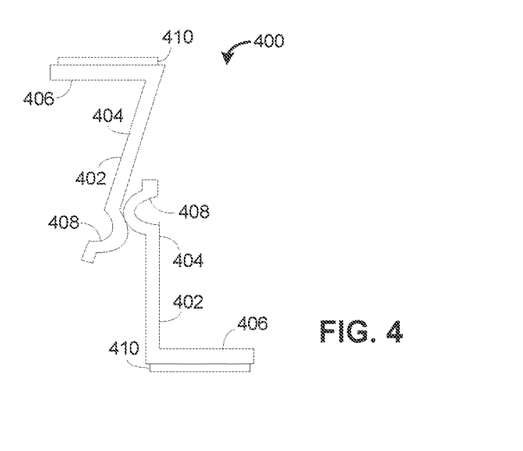
FIG. 4 is a side view of an interconnect contact in accordance with one example.
Figure 5:
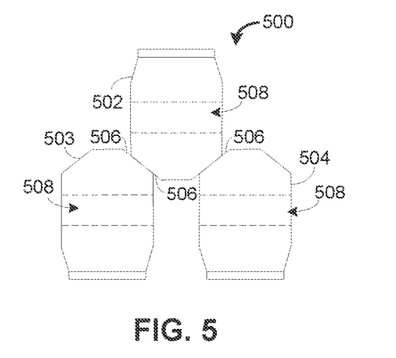
FIGS. 5 and 6 are side views of an interconnect contact in accordance with another example.
Figure 6:
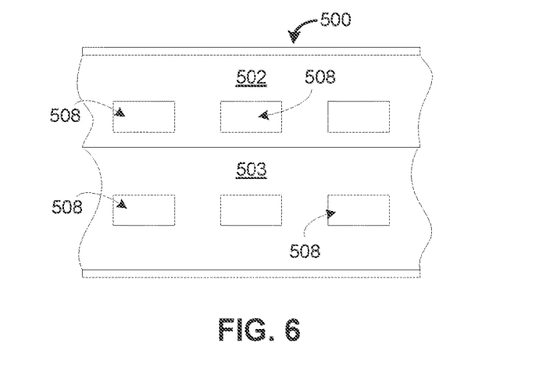
Figure 7:
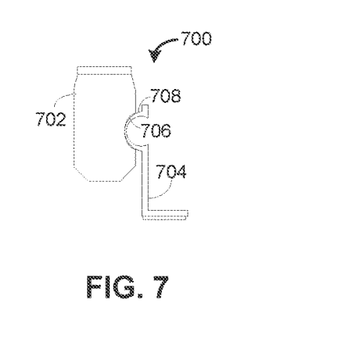
FIGS. 7 and 8 are side views of an interconnect contact in accordance with yet another example.
Figure 8:
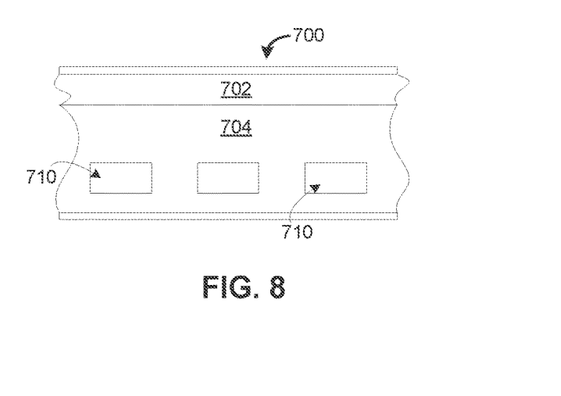

FIGS. 4-8 are examples of interconnects having contacts configured to avoid imparting force upon the display module. Avoiding such forces would, in turn, minimize or prevent the generation of optical defects. Avoiding such forces may also minimize or prevent the perceived deflection of the transparent cover of the electronic device. In of the depicted examples, the contacts are shaped to convert a vertical force to a lateral force. FIG. 4 depicts an example with strip-shaped contacts. FIGS. 5 and 6 depict an example with wedge-shaped contacts. FIGS. 7 and 8 depict an example in which one contact is strip-shaped and the other contact is wedge-shaped.

Turning to FIG. 4, an interconnection 400 includes a pair of strip-shaped contacts 402. Each contact 402 includes a bracket 404 configured and oriented to convert a vertical force imposed upon the display module 114 (FIG. 1) into a lateral force. Each contact 402 may be configured to act as a spring, such as a cantilever. In this example, the bracket 404 includes a base 406, a resilient arm 406 extending outward from the base 406. The resilient arm 406 acts as a spring that engages the other contact 402 once assembled. One or both of the resilient arms 406 may be pre-loaded. Each arm 406 terminates in a curved end 408. The curved ends 408 may act as clips that interlock the brackets 404. Friction and the lateral force exerted by the resilient arms 406 also hold the contacts 402 in place. The base 406 is secured to either the chassis 124 (FIG. 1) or the bottom cover 106 (FIG. 1) via an adhesive or other fastener 410.

In operation, an increase in the force applied to the display module 114 (FIG. 1) or the bottom cover 106 (FIG. 1) increases the extent to which the brackets 404 overlap with one another. In the example of FIG. 4, the force is a vertical (or compressive) force that acts to increase the extent to which the pair of contacts 402 are engaged. The arms 406 of the brackets 404 may increasingly overlap, e.g., pushing the contact 402 secured to the chassis 124 (FIG. 1) laterally outward. The cantilever configuration of the interconnection 400 thus converts the vertical force into a lateral, outward force.

The outward force may cause the display module 114 to be pulled down at its center rather than pushed up by an opposing force from the bottom cover 106 (FIG. 1). Visual artifacts or disturbances in the display output may thus be avoided. Display output problems may also or alternatively be avoided via the peripheral placement of the interconnect.

The contacts 402 are secured to the chassis 124 (FIG. 1) or the bottom cover 106 (FIG. 1) by adhesive pads 406. The adhesive pads 406 may be conductive to support the electrical connection. Any conductive adhesive material may be used. The composition, construction, and other characteristics of the adhesive pads 406 may vary. Other fasteners may be used.

In FIGS. 5 and 6, an interconnection 500 includes an arrangement of wedge shaped contacts 502-504. In this example, the arrangement includes three contacts 502-504 that extend the length of the interconnect wall. The contact 502 may be adhesively or otherwise secured to the chassis 124 (FIG. 1). The other two contacts 503, 504 may be adhesively or otherwise secured to the bottom cover 106 (FIG. 1). Other arrangements may include additional or fewer contacts.

Each contact 502-504 may be constructed as a foam block. The foam of the block may include, or be composed of, metal and/or another conductive material. Alternatively or additionally, the foam of the block may be enclosed in a conductive wrapper. For example, the conductive wrapper may be configured as a conductive fabric. The conductive wrapper may include, or be composed of, metal and/or another conductive material.

Each contact 502-504 includes a resilient wedge configured to slidably engage one of the other contacts. In the example of FIG. 5, each contact 502-504 includes a chamfered edge 506. The chamfered edges 506 of adjacent blocks 502-504 slidably engage one another such that a compressive or vertical force is converted into a lateral force. As the overlap of the contacts 502-504 changes with the applied force, one or more of the resilient wedges may act as a spring. In this example, the wedge 502 may be compressed laterally, and the wedges 503 and 504 are deflected laterally. In other examples (e.g., a two-wedge arrangement), all (e.g., both) of the wedges are deflected laterally.

The contacts 502-504 are also discontinuous to allow air flow. As shown in FIG. 6 (and in phantom in FIG. 5), each resilient wedge has an aperture 508 oriented to allow the air flow passing through the case to reach the electronics module 130 (FIG. 1). The size, shape, and spacing of the apertures 508 may vary in accordance with the same factors described above in connection with FIG. 3. For example, the apertures 508 may be larger when greater air flow is warranted, and/or smaller when more noise suppression is warranted.

FIGS. 7 and 8 depict an interconnection 700 that involves a hybrid of the above-described contact arrangements. In this example, the interconnection 700 includes a strip-shaped contact 702 and a wedge-shaped contact 704 that overlaps the strip-shaped contact 702. One or both of the contacts 702, 704 may be resilient as described above. The contacts 702, 704 are configured to slidably engage one another to convert the vertical force into a lateral force. To that end, the wedge-shaped contact 704 has a detent 706 in which a curved end 708 of the contact 702 is captured. As the vertical force increases the overlap of the contacts 702, 704, one or both of the contacts 702, 704 are deflected laterally.

The interconnection 700 is also configured to allow air flow. In this example, as shown in FIG. 8, the strip-shaped contact 702 has a number of apertures 710. The apertures 710 may be distributed along the length of the contact 702 as shown. Alternatively or additionally, the strip-shaped contact 702 may be gapped as described above in connection with the example of FIGS. 1-3. In these and other cases, the wedge-shaped contact 704 may include apertures for air flow.

Still other types of interconnections may be used. For example, contacts may be constructed from conductive elastomers and wire brush arrangements.

The construction and configuration of the device 100 may vary from the example shown in FIG. 1. The case 102 and the transparent cover 112 may not the only components relied upon to enclose the internal components of the device 100. In other cases, additional structures, such as a side-mounted antenna, may also be used to enclose the internal components. The case 102 and the transparent cover 112 may have a variety of shapes to accommodate various form factors of the device 100.

The transparent cover 112 may be composed of one or more layers of glass (e.g., chemically strengthened or non-strengthened glass) and/or plastic. In other examples, the external display layer of the electronic device 100 may be an integral layer or component of the display module 114. For example, an external polarizer of the display module 114 may act as the external display layer.

In the example of FIG. 1, the display module 114 is adjacent to the transparent cover 112. In some cases, the transparent cover 112 and the display module 114 are contiguous with one another. The transparent cover 112 and the display module 114 may be adhesively bonded or otherwise secured to one another. In other cases, one or more transparent films, layers, or other structures are disposed between the transparent cover 112 and the display module 114.

Each unit of the display module 114 may be a composite structure that includes multiple constituent layers or films. Each layer or film may be considered a component of the display module 114. In some cases, the touch sensor unit 116 may be formed on the back side of the transparent cover 112 or added thereto as a film, as in an on-cell touch sensor arrangement. The LCD unit 120 may include a liquid crystal layer disposed between two glass layers, e.g., a color filter layer and an active matrix layer.

The display module 114 may include additional, fewer, or alternative units, panels, or layers. For example, the display module 114 may include an emissive display layer, such as an organic light emitting diode (OLED) layer, rather than the backlight and LC units 118, 120. Alternatively or additionally, one or more components or layers of the units of the display module 114 may be integrated with the transparent cover 112. For example, the transparent cover 112 may be replaced by one or more components or constituent layers of the display module 114. For example, the display module 108 may include a touch sensor panel pre-applied to the outer surface of the color filter layer of the LCD unit 120 in an in-cell touch sensing arrangement. In such cases, the external display layer of the device 100 may be provided by the external polarizer of the LCD unit 120. The relative positions of the units of the display module 114 (and/or constituent layers thereof) may thus vary. The extent to which the units are integrated may also vary.

The configuration and construction of the units of the display module 114 may vary. In some cases, the touch sensor unit 116 may be or include the Exclear touch sensor film commercially available from Fujifilm Corporation, but other sensors and/or sensor films may be used. The LCD unit 120 may be configured as an in-plane switched (IPS) display or a plane-to-line switched (PLS) display, but other types of display technologies may be used, such as vertical alignment (VA) displays.

The case 102 may have a one-piece construction. For example, the sidewalls 108 and the back cover 106 may be integrally formed. In other cases, the shell 102 may be a composite structure. For example, the shell 102 may include a bezel or other peripheral component extending from the sidewalls 108. A variety of other shell configurations and constructions may be used for the case 102. For example, in some cases, the case 102 does not include sidewalls. In such cases, the transparent cover 112 may be curved or include sidewalls that meet the back cover 106 of the shell 102. In other examples, both the transparent cover 112 and the case 102 are curved to meet one another or another component of the external surface.

In some cases, the bezel or sidewalls 108 may be configured as, or include, one or more antenna strips. Each antenna strip may be composed of a metal or other conductive material, The electronic device 100 may include any number of antennas 104. The antenna(s) 104 may be disposed in any location along the exterior of the device 100. For example, one or more antennas 104 may be mounted along an outer surface of the sidewalls 108. The composition, construction, shape, size, and other characteristics of the antenna(s) 104 may vary.

The chassis 124 may have a one-piece or multi-piece construction. In one example, the base plate 126 may be composed of, or include, one material, while other components, such as the sidewalls 128, are composed of another material (or other materials). The base plate 126 may extend over an entire lateral extent of the display module 114. For example, the base plate 126 may extend across an entire viewable area of the display module 114. The base plate 126 may nonetheless include one or more openings, such as a cable pass-through and/or other openings for flex cables and/or other connectors to communicatively couple the display module 114 and the electronics module 130. Alternative or additional openings may be provided for mounting purposes. The base plate 126 may have any number of openings of varying size and still provide structural support in the central area for the display module 114 and other components of the device 100. The base plate 126 may also have any number of indentations to accommodate the shape or size of other internal components of the device 100. The base plate 126 may thus be flat or generally flat.

The electronics module 130 and/or the battery 132 may be secured to an underside of the chassis 124. The chassis 124 may be configured such that the electronics module 130 and/or the battery 120 may be mounted to the base plate 126. For example, the base plate 126 may have a number of screw bosses integrally formed thereon or fabricated thereon. Screw or other fasteners (e.g., adhesive materials) may then be used to secure the electronics module 130 and the battery 132 to the rearward facing side of the base plate 126. The assembly of the chassis 124 and the electronics module 130 and the battery 132 may then be dropped into the bucket formed by the case 102. In other cases, the electronics module 130 and the battery 132 may be press-fit or otherwise secured to the chassis 124 and/or the case 102.

Figure 9:
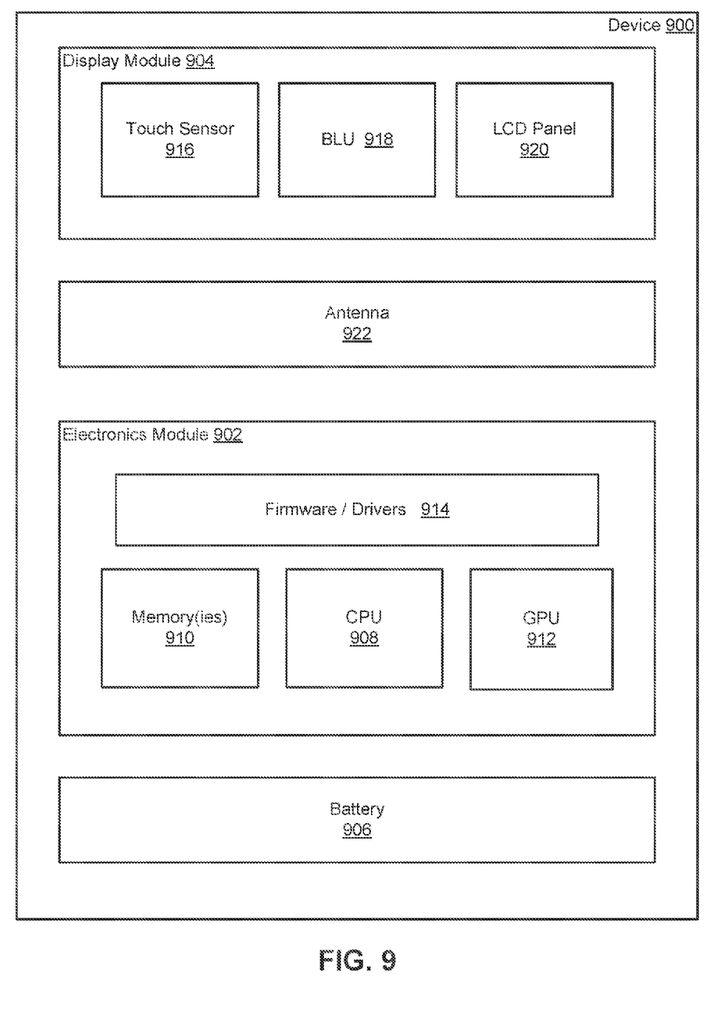
FIG. 9 is a block diagram of an electronic device for which a display chassis may be used to support a display module and provide shielding for an antenna.

FIG. 9 shows an exemplary electronic device 900 with an electronics module 902 that may be shielded as described herein. The electronic device 900 further includes a display module 904 and a battery 906, each of which is coupled to the electronics module 902. The display module 904 may be integrated with the electronics module 902 and/or other components of the electronic device 900 to a varying extent. For instance, the electronics module 902 and/or the display module 904 may include a graphics subsystem of the electronic device 900. Any number of display modules or systems may be included. In this example, the device 900 includes a processor 908 and one or more memories 910 separate from the display module 904. The processor 908 and the memories 910 may be directed to executing one or more applications implemented by the device 900. The display module 904 generates a user interface for an operating environment (e.g., an application environment) supported by the processor 908 and the memories 910. The processor 908 may be a general-purpose processor, such as a central processing unit (CPU), or any other processor or processing unit. Any number of such processors or processing units may be included.

In the example of FIG. 9, the electronics module 902 includes a graphics processing unit (GPU) 912 and firmware and/or drivers 914 for one or more components of the display module 904. The GPU 912 may be dedicated to graphics- or display-related functionality and/or provide general processing functionality. Some of the components of the electronics module 902 may be integrated. For example, the processor 908, the one or more of the memories 910, the GPU 912, and/or the firmware 914 may be integrated as a system-on-a-chip (SoC) or application-specific integrated circuit (ASIC).

The electronics module 902 may include additional, fewer, or alternative components. For example, the electronics module 902 may not include a dedicated graphics processor, and instead rely on the CPU 908 or other general-purpose processor to support the graphics-related functionality of the electronic device 900. The electronics module 902 may include additional memory (or memories) to support display-related processing.

In the example of FIG. 9, the display module 904 includes a touch sensor unit 916, a backlight unit (BLU) 918, and an LCD panel or unit 920. Additional, fewer, or alternative components may be provided. For example, in some cases, the display module 904 does not include the backlight unit 918 and/or the LCD panel 920. The display module 904 may instead include an OLED display unit.

The device 900 includes an antenna 922 shielded from the electromagnetic noise generated by the electronics module 902 as described above. The antenna 922 may be any type of antenna. The type of communication connection may thus vary. The device 900 may include one or more additional antennas, any number of which may also be shielded as described above.

The device 900 may be configured as one of a wide variety of computing devices, including, but not limited to, handheld or wearable computing devices, such as tablets and watches, communication devices such as phones, laptop or other mobile computers, personal computers (PCs), server computers, set top boxes, programmable consumer electronics, network PCs, minicomputers, mainframe computers, audio or video media players, and other devices. The device 900 may alternatively be configured as one of a wide variety of display devices, such as a monitor or a television.

In one aspect, an electronic device includes a case, an antenna supported by the case, a display module disposed within the case, a conductive chassis disposed within the case, the conductive chassis structurally supporting the display module, an electronics module disposed within the case such that the conductive chassis is positioned between the antenna and the electronics module, and an interconnect that electrically connects the conductive chassis and the conductive component of the case, the interconnect extending around/surrounding the electronics module.

In another aspect, an electronic device includes a case including a conductive component, an antenna supported by the case, a display module disposed within the case, a conductive chassis disposed within the case, the conductive chassis structurally supporting the display module, an electronics module disposed within the case such that the conductive chassis is positioned between the antenna and the electronics module, and an interconnect that electrically connects the conductive chassis and the conductive component of the case, the interconnect being disposed along a perimeter of the conductive chassis to surround the electronics module.

In yet another aspect, an electronic device includes a case including a conductive component, an antenna supported by the case, a display module disposed within the case, a conductive chassis disposed within the case, the conductive chassis structurally supporting the display module, an electronics module disposed within the case such that the conductive chassis is positioned between the antenna and the electronics module, and an interconnect that electrically connects the conductive chassis and the conductive component of the case, the interconnect surrounding the electronics module. The interconnect is discontinuous.

In connection with any one of the aforementioned aspects, the systems, devices, and/or methods described herein may alternatively or additionally include any combination of one or more of the following aspects or features. The interconnect is disposed along a perimeter of the conductive chassis to surround the electronics module. The interconnect is discontinuous to allow air flow passing through the case to reach the electronics module. The interconnect includes a plurality of spaced apart contacts that extend from the conductive chassis and/or the case. Each contact includes a spring oriented to convert a vertical force imposed upon the display module into a lateral force. Each contact includes a respective strip. The strips along a first wall of the interconnect are oriented in parallel with a plane of the first wall. The strips along a second wall of the interconnect are oriented orthogonally to a plane of the second wall. Each contact includes a resilient wedge configured to slidably engage a further contact of the plurality of spaced apart contacts. The resilient wedge has an aperture oriented to allow the air flow passing through the case to reach the electronics module. The case includes a conductive component disposed along a rear side of the case. The interconnect electrically connects the conductive chassis and the conductive component of the case. The display module includes a frame and a plurality of display components supported by the frame. The frame is disposed within, and supported by, the conductive chassis. The case includes a sidewall. The conductive chassis includes a sidewall disposed inward of, and extending along, the sidewall of the case. The antenna is mounted on the sidewall of the case outward of the sidewall of the conductive chassis.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An electronic device comprising:
   a case;
   a display module disposed within the case;
   a conductive chassis disposed within the case, the conductive chassis structurally supporting the display module;
   an electronics module disposed within the case such that the conductive chassis is disposed between the display module and the electronics module;
   an interconnect that electrically connects the conductive chassis and the case; and an antenna positioned relative to the electronics module such that the conductive chassis and the interconnect shield the antenna from noise generated by the electronics module.

2. The electronic device of claim 1, wherein the interconnect is disposed along a perimeter of the conductive chassis to surround the electronics module.

3. The electronic device of claim 1, wherein the interconnect is discontinuous to allow air flow passing through the case to reach the electronics module.

4. The electronic device of claim 3, wherein the interconnect comprises a plurality of spaced apart contacts that extend from the conductive chassis and/or the case.

5. The electronic device of claim 4, wherein each contact comprises a spring oriented to convert a vertical force imposed upon the display module into a lateral force.

6. The electronic device of claim 4, wherein each contact comprises a respective strip.

7. The electronic device of claim 6, wherein the strips along a first wall of the interconnect are oriented in parallel with a plane of the first wall, and wherein the strips along a second wall of the interconnect are oriented orthogonally to a plane of the second wall.

8. The electronic device of claim 3, wherein each contact comprises a resilient wedge configured to slidably engage a further contact of the plurality of spaced apart contacts.

9. The electronic device of claim 8, wherein the resilient wedge has an aperture oriented to allow the air flow passing through the case to reach the electronics module.

10. The electronic device of claim 1, wherein:
the display module comprises a frame and a plurality of display components supported by the frame; and
the frame is disposed within, and supported by, the conductive chassis.

11. An electronic device comprising:
a case;
a display module disposed within the case;
a conductive chassis disposed within the case, the conductive chassis structurally supporting the display module;
an electronics module disposed within the case such that the conductive chassis is disposed between the display module and the electronics module;
an interconnect that electrically connects the conductive chassis and the case, the interconnect comprising a plurality of spaced apart contacts configured and oriented to convert a vertical force imparted on the display module into a lateral force; and
an antenna positioned relative to the electronics module such that the conductive chassis and the interconnect shield the antenna from noise generated by the electronics module.

12. The electronic device of claim 11, wherein the interconnect is discontinuous to allow air flow passing through the case to reach the electronics module.

13. The electronic device of claim 11, wherein the plurality of spaced apart contacts extend from the conductive chassis and/or a conductive component of the case.

14. The electronic device of claim 11, wherein each contact comprises a spring oriented to convert the vertical force imposed upon the display module into the lateral force.

15. The electronic device of claim 11, wherein each contact comprises a respective strip.

16. An electronic device comprising:
a case comprising a conductive component disposed along a rear side of the case;
a display module disposed within the case;
a conductive chassis disposed within the case, the conductive chassis structurally supporting the display module;
an electronics module disposed within the case such that the conductive chassis is positioned between the display module and the electronics module; and
an interconnect that electrically connects the conductive chassis and the conductive component of the case; and
an antenna positioned relative to the electronics module such that the conductive chassis and the interconnect shield the antenna from noise generated by the electronics module.

17. The electronic device of claim 16, wherein the conductive component is disposed along a rear side of the case.

18. The electronic device of claim 16, wherein:
the display module comprises a frame and a plurality of display components supported by the frame; and
the frame is disposed within, and supported by, the conductive chassis.

19. The electronic device of claim 16, wherein:
the case comprises a sidewall;
the conductive chassis comprises a sidewall disposed inward of, and extending along, the sidewall of the case; and
the antenna is mounted on the sidewall of the case outward of the sidewall of the conductive chassis.

20. The electronic device of claim 16, wherein the interconnect comprises a plurality of spaced apart contacts that extend from the conductive chassis and/or the case.

* * * * *